United States Patent [19]

Franaszek et al.

[11] 3,720,875

[45] March 13, 1973

[54] DIFFERENTIAL ENCODING WITH LOOKAHEAD FEATURE

[75] Inventors: Peter A. Franaszek, Mt. Kisco; David D. Grossman, Yorktown Heights, both of N.Y.; Peter M. Will, Norwalk, Conn.

[73] Assignee: International Business Machines Corporation, Armonk, N.Y.

[22] Filed: Nov. 3, 1971

[21] Appl. No.: 195,398

[52] U.S. Cl. .............325/38 B, 178/68, 340/347 DD

[51] Int. Cl. ............................................H03r 13/22

[58] Field of Search...........325/38 A, 38 R, 38 B, 42; 178/68, DIG. 3; 340/347 DD

[56] References Cited

UNITED STATES PATENTS

| | | | |
|---|---|---|---|
| 3,394,352 | 7/1968 | Wernikoff et al. | 340/347 DD |
| 3,596,267 | 7/1971 | Goodman | 340/347 DD |
| 3,601,702 | 8/1971 | Lender | 178/68 R |

*Primary Examiner*—Thomas A. Robinson
*Attorney*—Charles P. Boberg et al.

[57] ABSTRACT

Analog input information is compacted by a differential encoding process that anticipates abrupt transitions in signal levels and initiates compensatory action in time to prevent the encoded representations of such transitions from being shifted out of phase due to slope overload. Digitized analog signal representations which are to be encoded are first passed through a shift register having L stages, the number L signifying the amount of "lookahead", i.e., the number of sampled analog elements that are to be analyzed as a group prior to encoding. The contents of the shift register at any instant will furnish the "history" of variations in the respective levels of the first L signal elements which currently await encoding. By a judicious interpretation of this history, the system is able to select an optimal encoded bit pattern which would most nearly represent in compact digital code form the apparent trend of these variations, and the leading bit or bits of this pattern will be fed out by the encoder. The optimal bit pattern is continually updated as the makeup of the lookahead code group changes. By anticipating rapid changes of level, the phase shift of elements having highly contrasting levels is avoided.

8 Claims, 4 Drawing Figures

INVENTORS
PETER A. FRANASZEK
DAVID D. GROSSMAN
PETER M. WILL

BY Charles P. Boberg
ATTORNEY

DIFFERENTIAL ENCODING WITH LOOKAHEAD FEATURE

BACKGROUND OF THE INVENTION

1. Field of the Invention

This invention relates to the processing of analog information such as image data in compacted form, and in particular it relates to differential encoding techniques for enabling picture elements or other sampled analog signal elements to be represented by compact digital codes that require only one bit or a few bits per element. The present description will refer particularly to image data processing, but it has application to analog information processing in general.

2. Description of the Prior Art:

When images are converted into digitized form for transmission or storage purposes, their picture elements are represented at one stage or another by a coding notation which requires a relatively large number of bits per picture element. Eight bits (one byte), for example, may be used to represent various shades or grey levels on a scale of values from 0 to 255, where the extreme values represent black and white (or vice versa), and the intermediate values represent intervening levels or shades of grey. For transmitting image data at a very high rate, or for storing such data at very high density, however, it is necessary to reduce the number of bits needed for representing the grey level of each picture element. This can be done by a differential encoding process, such as delta modulation ($\Delta M$) or differential pulse code modulation (DPCM); whereby the code for each picture element represents not the absolute grey level of that element but merely an approximate incremental difference between the grey level of the current picture element and the encoded grey-level representation of the element which immediately preceded it. In a delta-modulation encoding scheme which utilizes only one bit per picture element, for example, a "0" bit may represent a transition to a darker shade, while a "1" bit may represent a transition to a lighter shade. Adjoining picture elements which are at approximately the same grey level may be represented by a string of alternate 1's and 0's denoting a steady-state condition.

Conventional methods of differential encoding will work satisfactorily as long as there is not too abrupt a transition between the respective grey levels of adjoining picture elements. However, a sudden entry from, say, a nearly white area to a nearly black area of the scanned image may be well beyond the ability of the encoding processor to follow accurately. This condition is known as "slope overload." The consequent delay between the actual occurrence of such a transition and its representation in the encoded sequence may cause the area in question to appear misplaced with respect to the other parts of the reproduced picture. This tendency to distort the relative phase or positioning of high-contrast areas limits the rate at which present differential encoding methods can accurately process image data. Even the more sophisticated delta modulation schemes now available may not be suited for faithfully representing images that have many highly contrasting areas and which are being processed at very high speed.

SUMMARY OF THE INVENTION

An object of the present invention is to improve the fidelity with which signals representing analog phenomena may be processed at high speed by differential encoding methods, and particularly to prevent phase shift due to slope overload where the analog signal being processed has many abrupt transitions between widely differing levels.

This objective is accomplished by a novel procedure, herein termed "lookahead encoding," which enables rapid changes in the levels of adjoining signal elements to be anticipated in the coding more promptly than would otherwise be the case. In accordance with a feature of the invention (which is disclosed herein with reference to image data processing as an exemplary application) a series of picture element representations is temporarily stored and analyzed for trends in grey level variations before being encoded by the delta modulation or other differential encoding process. Abrupt changes will be detected long before they are encoded, and the coding that represents such changes will be initiated in sufficient time so that it will be accurately placed in the encoded sequence, notwithstanding the slope constraints imposed by the response time of the encoding apparatus. This may cause some initial inaccuracy as the system starts to respond early to the anticipated change, but phase shifts at the extreme peak and valley points in the response waveform will be avoided, so that the overall accuracy is greatly improved.

The foregoing and other objects, features and advantages of the invention will be apparent from the following more particular description of a preferred embodiment of the invention, as illustrated in the accompanying drawings.

DETAILED DESCRIPTION OF PREFERRED EMBODIMENT

Figure 1:
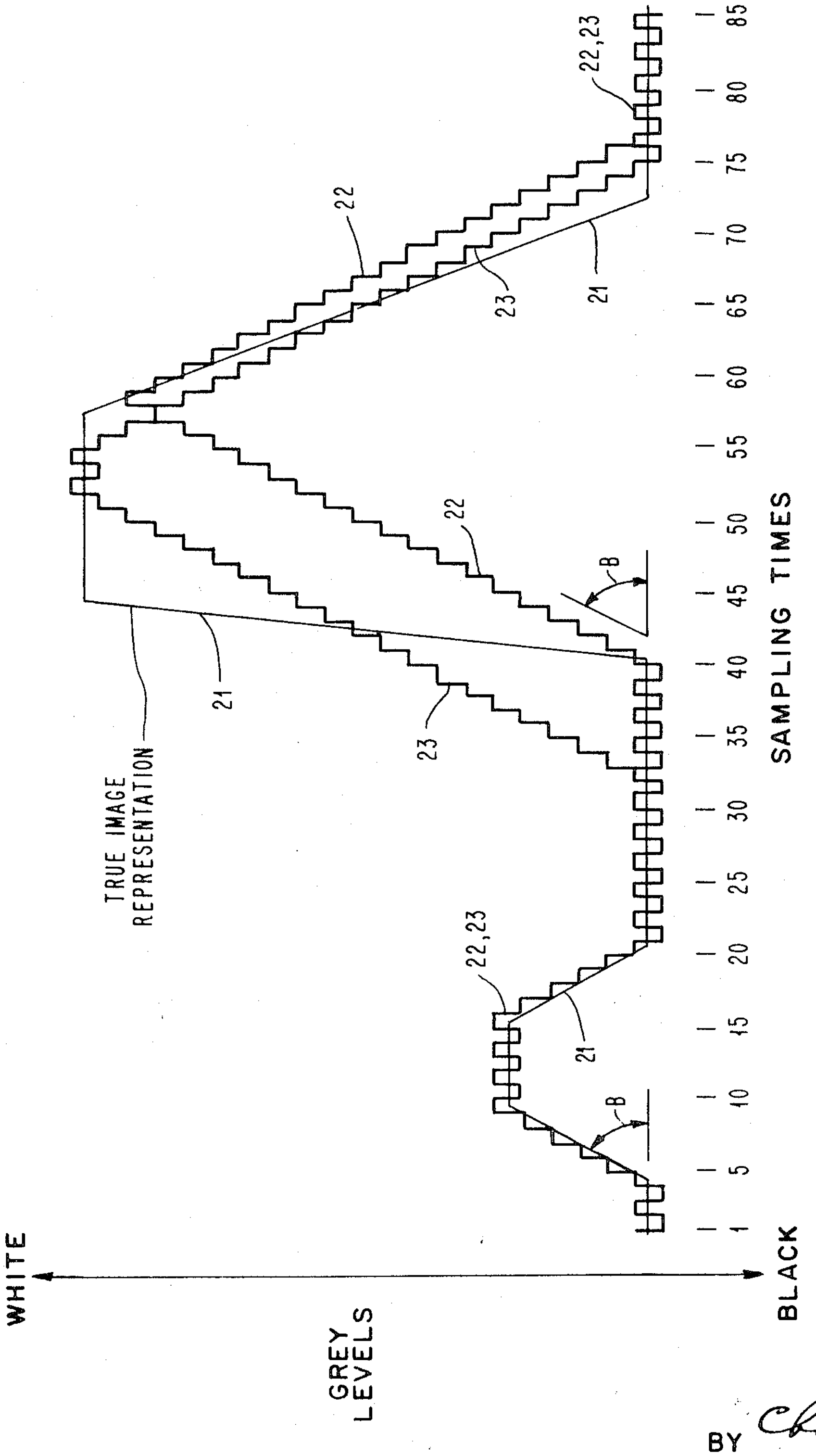
FIG. 1 is a set of time-based graphs depicting the approximate manner in which a differential encoding system may respond to a given input signal representation, with and without the lookahead encoding feature of the present invention.

The embodiment of the invention shown in the drawings is described as it would be applied to the processing of image data. However, as mentioned above, the invention also has application to other types of analog information processing.

Figure 2:
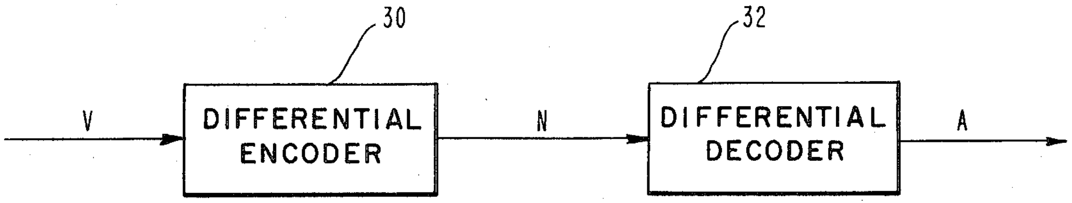
FIG. 2 is a simple block diagram of a conversion system for differentially encoding and decoding data.

Referring first to FIG. 2, the varying shades in the successive elements of the picture or image which currently is being scanned are converted by conventional means (not shown) into video code words V that represent absolute grey-level values. These video code representations V contain a sufficient number of bits per code word to represent the various grey levels of the respective picture elements (or "pixels") with a high degree of precision. For instance, if each of these code words contains eight bits (one byte), this would enable one to represent as many as 256 different shades or levels of grey.

If the image data were kept in the form of these multi-bit code words V, then the sequence of code words would represent the true image with a very high degree of accuracy. For large masses of image data, however, it is not economical to keep the data in this form, and resort is had to some type of differential encoding, such as delta modulation or differential PCM, which instead of expressing the absolute value of each picture element shade, merely expresses an incremental change between the grey level of the current picture element and the grey level represented by the output coding of the picture element that immediately preceded it. A less complex code, having a much smaller number of bits per code word, will suffice to represent these incremental differences.

Thus, referring to FIG. 2, the multibit grey level codes V are converted by encoder 30 to differential codes N which, in some systems, may have only a single bit per code word. In this form the image data may be highly compacted for efficient transmission or high-density storage. When the absolute grey level data again is needed for image reproduction, the differential codes N are converted by a decoder 32 to multibit absolute codes A. According to the accuracy with which the differential encoding process has been performed, the final codes A may or may not conform closely to the corresponding original codes V. (The word "code" is here used in the sense of a code symbol or coded representation.)

The technical difficulties which may attend a differential encoding process can be appreciated by referring to FIG. 1, which represents in greatly simplified form a typical sequence of events that may occur in the course of such an encoding operation. In this diagram the sampling times 1, 2, 3, etc., correspond respectively to various instants when the grey-level analog signal generated by the image scanning device is sampled and encoded into absolute codes to represent the shades or grey levels of discrete picture elements. The graph or curve 21 is a plot of the variations in shade or grey level of a series of these scanned picture elements. The graph 22 depicts the response of the encoding-decoding system, as represented by the decoded output A, FIG. 2, when the differential encoder does not have a lookahead feature. Graph 23, FIG. 1, represents the response of a system which includes the lookahead feature disclosed herein. It will be noted that the high peak region of the response graph 22 has a pronounced phase shift relative to the peak of the true image representation, whereas the response graph 23 has a peak which is substantially in phase with that of the true image representation.

During steady-state periods, when the analog image signal is at a constant level, the differentially encoded signal will consist of alternating positive and negative pulses (FIG. 1). These cancel each other out in net effect, but they also produce what is known as "granular noise."

It will be assumed for illustrative purposes that a slanted line having an angle of slope B, FIG. 1, represents the most rapid response that the differential encoding-decoding system can make to a transition between significantly different grey levels in succeeding picture elements. In those instances where the rate of transition does not exceed the slope B (as between the sampling times 5 and 10, FIG. 1, for example) the encoder will be able to follow the transition accurately. However, in those instances where the transition is more abrupt (as between the sampling times 40 and 45), the response of the conventional encoder will fall behind the true image representation (as illustrated by the behavior of the response characteristic 22, FIG. 1, between the sampling times 40 and 60), since it is limited to the maximum slope angle B which is considerably less than the slope of the true image graph 21 between the sampling points 40 and 45.

In this particular example, the conventional encoding technique will distort the image so that when it is reproduced, the picture elements that should have occurred at the peaked portion of graph 21, between points 45 and 60 of the sampling sequence, FIG. 1, will have no counterparts in graph 22, and the peak of graph 22 (which is of less amplitude than the peak of 21) is shifted in phase relative thereto. In addition to amplitude and phase distortions, there is also width distortion of the image signal peak. Hence, in critical regions such as this, severe distortions of the image representation are apt to occur in the conventional differential encoding process.

There are practical reasons for limiting the maximum slope angle B of the response characteristic. First, if the minimum increment by which the differentially encoded signal level may change were made too large, this would increase the above-described granular noise which is generated during steady-state intervals. Moreover, if this slope angle should approach 90° too closely, the system then would become unduly sensitive to extraneous noise pulses. A certain degree of noise immunity is needed, and to achieve this, the maximum slope angle B must be limited to a value substantially less than 90°, even though this results in the condition known as "slope overload" in high-contrast regions. The purpose of the present invention is to permit slope overloading to occur while minimizing its undesirable effects.

Instead of experiencing a delayed response to abrupt grey-level transitions, it would be preferable to have a hastened or expedited response, as illustrated by the graph 23, FIG. 1, which anticipates an abrupt change before it occurs. This may be accomplished (as will be described in more detail hereafter) by a technique that delays the response in actual time but not in relative time, enabling a "lookahead" sequence of picture-element shades to be analyzed for sudden transitions before they are differentially encoded. Thus, as shown in FIG. 1, an abrupt change in grey level between sampling points 40 and 45 in the actual time sequence of the scanning operation will be anticipated starting at point 33 in the time sequence of the differential encoding operation. This causes the response curve 23 to start rising at point 33 of the encoding sequence, whereas otherwise it would have waited until point 40 or 41 of this sequence. There will be some initial discrepancy between the differentially encoded image representation and the true image representation (sampling points 33 to 42) due to the accelerated response which the system makes; yet the peak of the response curve 23 will reach the proper amplitude and be displaced very little from the center of the true peak, and there will be less discrepancy in peak width. As a result, this high-contrast region of the original image will be more faithfully represented by the graph 23, which depicts the response of the system with lookahead encoding, than it would be by the graph 22, which depicts a typical response without lookahead encoding.

Thus, it is seen that even though the maximum response rate of a differential encoder must be limited, for practical reasons, to a value much less than the rate at which transitions between significantly different grey levels can occur in the true image representation, nevertheless a system equipped with the present "lookahead" feature (to be described in detail presently) will satisfactorily adjust its encoding operations to compensate for this relative slowness of response on the part of the differential encoder. In this way the advantage of data compaction is obtained without an undue sacrifice of encoding accuracy and without introducing undue sensitivity into the differential encoding process.

Figure 3:
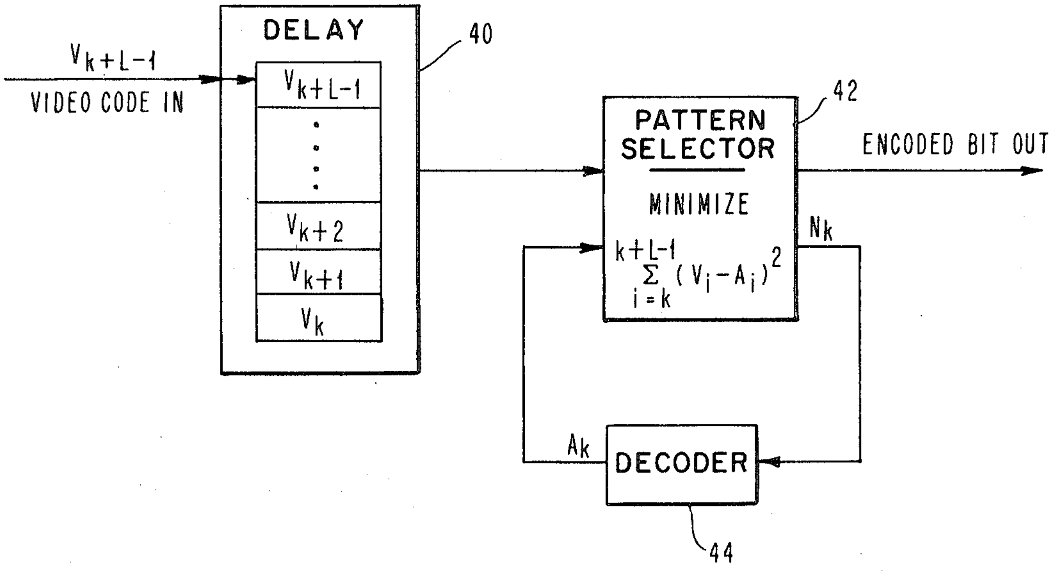
FIG. 3 is a general block diagram of an illustrative differential encoder which embodies the lookahead feature of this invention.

FIG. 3 is a functional representation of a differential encoder which is provided with a lookahead feature in accordance with the principle of the invention. Included in this encoder is a delay unit 40 comprising, for example, a shift register having L stages, where L is the number of picture-element code symbols contained in the lookahead sequence, i.e., the number of absolute-value code words in the V series (FIG. 2) which will be analyzed to determine the differential encoding of the picture element currently under consideration.

In the description which follows, the subscript $k$ will represent any integer from 1 to the total number of picture elements in the image being processed. As shown in FIG. 3, a sequence of input code words $V_k, \ldots V_{k+L-1}$ equal in number to L is assembled in the shift register 40. The pattern of grey level variations represented by this sequence is analyzed by a pattern selector 42 to select a pattern of differential codes $N_k, N_{k+1}, \ldots N_{k+L-1}$ which, if decoded would yield a series of code words $A_k, A_{k+1}, \ldots A_{k+L-1}$ that conforms in optimum fashion to the lookahead code sequence currently stored in the delay unit 40. Once the optimum pattern has been selected, the first value $N_k$ in this series of values $N_k \ldots N_{k+L-1}$ is read out as the code symbol for the current input code $V_k$ (i.e., the code symbol representing the grey level of the current picture element). The contents of register 40 then are shifted by one stage, a new input code word is entered into the $V_{k+L-1}$ position of this register, and a new pattern of N codes is selected by the unit 42 to give the optimum representation of the lookahead sequence in differentially encoded form. This continual updating and analysis of the set of code words in the lookahead sequence insures that any sudden changes in shade will be detected soon enough to start a corresponding trend in the differentially encoded output, so that the high-contrast areas of the image are not unduly distorted.

The pattern selector 42, FIG. 3, operates in a manner such as to satisfy some definite performance criterion which has been specified. For each setting of the shift register 40, a number of different code patterns $N_k \ldots N_{k+L-}$ must be tested for optimum response. Assume, for example, that L = 3 and that the register 40 stores a series of codes $V_1$, $V_2$ and $V_3$, each containing, say, eight bits. It will be assumed also that each of the differential codes $N_1$, $N_2$ and $N_3$ contains a single bit, 1 or 0, with "1" representing an upward step in a delta modulation type of encoding process, and "0" representing a downward step in that process. For each set of three input code words stored in the delay unit 40, there will be eight possible bit patterns or sets of binary code words that must be considered by the pattern selector 42, namely:

| | | | |
|---|---|---|---|
| 000 | 001 | 010 | 011 |
| 100 | 101 | 110 | 111 |

In general, there would be $2^L$ of these bit patterns to be considered.

The pattern selector 42 now proceeds to apply some specified performance criterion to these various bit patterns in order to select the one which, when decoded, would yield a response that corresponds in optimum fashion to the history of the shading variations represented by the lookahead code sequence $V_1$, $V_2$ and $V_3$ (or in general, $V_k \ldots V_{k+L-1}$) currently stored in register 40. To do this, the selector 42 considers each bit pattern in turn, and it passes the bits of each pattern through a decoder 44 which performs the same function as decoder 32, FIG. 2, yielding an output code $A_k$ having the same format as the input code $V_k$, but not necessarily identical in value thereto. The selector 42 then computes a specified function of $V_k \ldots V_{k+L-1}$ and $A_k \ldots A_{k+L-1}$ which measures the performance that the system would exhibit if the current test pattern or test sequence $N_1$, $N_2$, $N_3$ were chosen as the optimum encoded sequence.

Any of several performance criteria may be utilized. For illustrative purposes the criterion in the present case is expressed as the minimum value of the function:

$$P = \sum_{i=k}^{k+L-1} (V_i - A_i)^2$$

If $V_1$ is assumed to be the leading one of the codes currently stored in the shift register 40, then $k = 1$. The procedure then is to compute the sum of the values of $(V_i - A_i)^2$ for all values of $i$ from 1 to L for each of the possible test patterns $N_1, \ldots N_L$, of which there will be $2^L$ such patterns. The test pattern which causes the sum of the values of $(V_i - A_i)^2$ to be a minimum will be the optimum bit pattern. The first bit of this sequence, $N_1$, is then fed out by the encoder as the differentially encoded bit corresponding to the current input code word $V_1$, which is assumed to be the leading code word currently stored in shift register 40.

Performance criteria other than the one specified above may be chosen if desired. The choice may depend upon the type of image data being processed (textual information as compared with pictures, for example). In the specific embodiment described hereafter, the minimum value of the function given above will be taken as the performance criterion.

Figure 4:
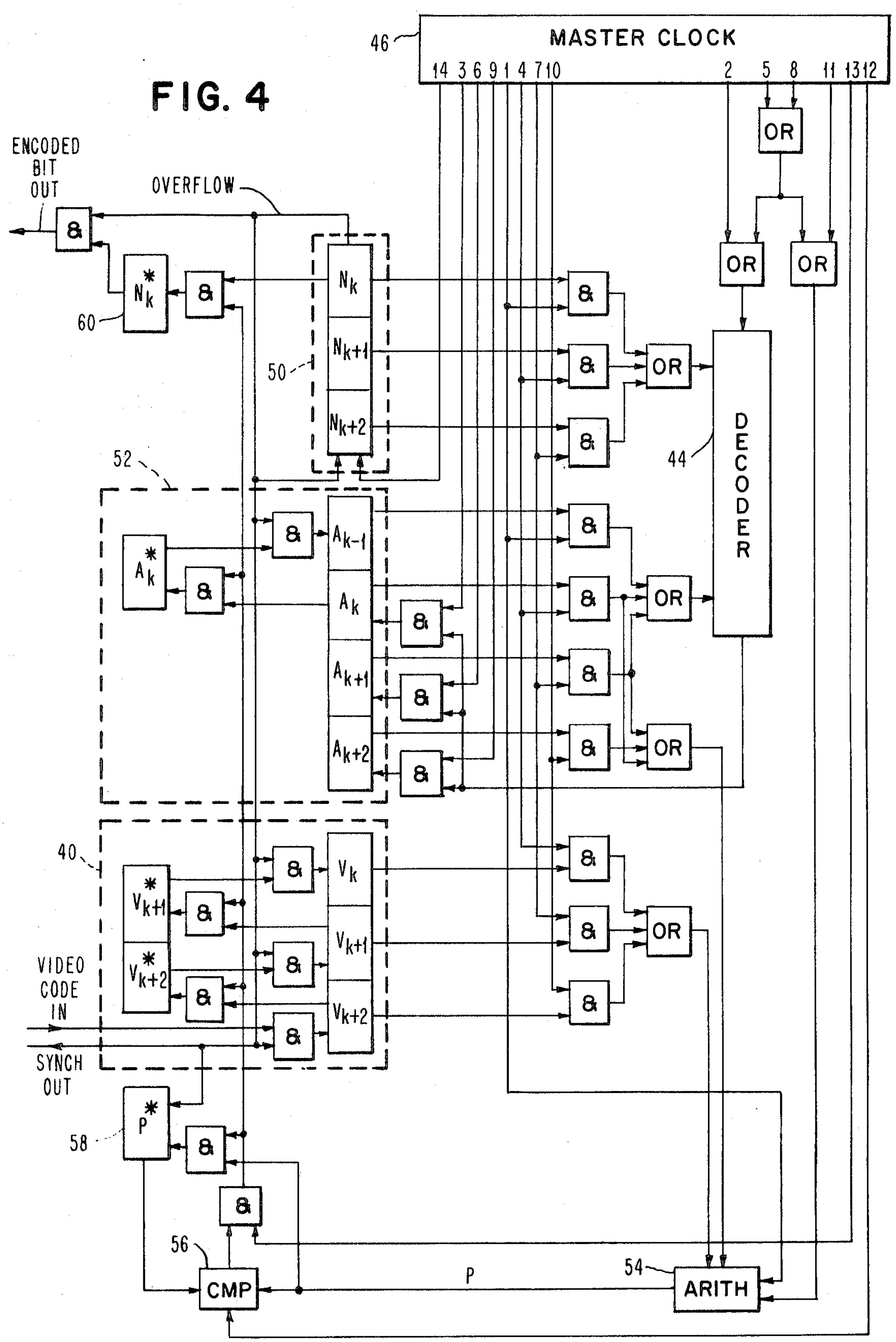
FIG. 4 is a more detailed schematic showing of the encoder represented in FIG. 3, assuming the number of lookahead stages (L) to be 3.

Referring now to FIG. 4, there is shown a schematic layout of a differential encoder for performing the functions attributed to the units 40, 42 and 44 shown in FIG. 3. The shift register or delay unit 40 and the decoder 44 of FIG. 3, are identified by like reference numbers in FIG. 4. The remainder of the apparatus shown in FIG. 4, except for the master clock 46, is included within the unit identified as the pattern selector 42 in FIG. 3.

In the embodiment of FIG. 4 it is assumed that L = 3. Hence, the shift register 40 has three stages which respectively store the absolute video input codes $V_k$, $V_{k+1}$ and $V_{k+2}$, $k$ being any integer from 1 to the total number of picture elements to be differentially encoded. Actually, only one bit-storing position of each register stage is shown in FIG. 4. Since each of the V codes is assumed, in the present embodiment, to constitute a multibit word, there will be as many bit storage cells per stage as there are bits per V code word. Thus, if the absolute grey-level value is represented by an eight-bit code, then each register stage such as $V_k$, for example, actually would consist of eight cells with parallel-bit inputs. For simplicity, however, the register 40 is shown in FIG. 4 as having only one bit-storage cell per stage. (The same convention is adopted for some of the other registers shown in FIG. 4, to be identified hereinafter.) The purpose of the cells marked $V^*_{k+1}$ and $V^*_{k+2}$ will be explained presently.

The master clock 46 emits a sequence of timing pulses numbered from 1 through 14. These should not be confused with the sampling times 1, 2, 3, etc., FIG. 1. The entire series of master clock pulses must be generated as many times as needed between each successive pair of sampling times (or in other words, between two successive entries of video codes into the shift register 40) in order to perform the required bit pattern tests.

The manner in which the various bit pattern tests are performed for each set of video codes currently stored in the shift register 40 will be explained with reference to FIG. 4. In the present example it is assumed that the length L of the lookahead sequence is 3. Further, it is assumed that encoding is accomplished by a simple delta modulation process that generates a single code bit, 1 or 0, for each multibit video code that is fed into the encoder. For each setting of the shift register 40, therefore, a set of eight three-bit patterns is to be tested. These bit patterns are stored one at a time in a three-cell counter 50, FIG. 4, starting with 000, this setting being incremented by 1 between tests.

The performance criterion P which is used in this example will be the minimum value of the function:

$$P=\sum_{i=k}^{k+2}(V_i-A_i)^2,$$

where $k$ is initially equal to 1 and is incremented by 1 each time the setting of counter 50 is incremented from 111 to 000 (i.e., after the testing of each set of eight three-bit patterns successively set up in register 50 has been accomplished). Each time a bit pattern $N_k$, $N_{k+1}$, $N_{k+2}$ is tested, it is first converted by decoder 44 into the corresponding set of absolute codes, $A_k$, $A_{k+1}$, $A_{k+2}$, which, along with the absolute code $A_{k-1}$ from the preceding set, is stored in a register 52, FIG. 4. As in the case of the register 40 which stores the video (V) codes, only one cell in each of the positions of register 52 is shown, whereas actually there are as many cells per position as are needed for storing all the bits of an absolute code such as $A_k$, for example.

Various other devices are included in the encoding apparatus shown in FIG. 4 and will be referred to individually as the description of operation proceeds. The "&" symbol is used in FIG. 4 to represent an AND circuit. The arithmetic unit 54 is adapted to perform an operation involving the calculation and accumulation of successive $(V-A)^2$ values for each N bit pattern being tested. The comparator 56 compares the output value P furnished by the arithmetic unit 54 with a value P* stored in a multibit register 58 (of which only one bit-storage cell is shown), P* being the maximum value of P which is considered acceptable in the present state of the computations. If P is less than P*, then the current value of P is substituted for the current value of P*. Register 60 is a single-bit storage device for storing a bit having the value $N^*_k$, which is tentatively the value of the encoded bit, subject to possible change if a different bit pattern is chosen before the encoded bit is read out.

OPERATION

The master clock 46, FIG. 4, emits its timing pulses in the numerical order indicated. Each timing pulse initiates a particular step of the operation, as will be described below. Just prior to the emission of timing pulse No. 1, shift register 40 will be storing the three video (V) input codes which form the current lookahead sequence. Counter 50 stands at 000 to represent the first of the N bit patterns to be tested. Register 52 is storing the value $A_{k-1}$, which is the absolute code corresponding to the encoded bit $N_{k-1}$ that most recently was generated by the encoder. The remaining A codes stored in register 52 are of only academic interest at this time. The initial value of P* in register 58 will have been set to the maximum possible value that P may have.

Since it is assumed in the present example that there are eight combinations of three-bit N codes to be tested, the sequence of 14 steps described below will be performed eight times for each code bit that is fed out of the encoder. This involves setting up eight different sets of absolute codes $A_k$, $A_{k+1}$, $A_{k+2}$, to correspond with the differentially decoded equivalents of the eight different N-bit patterns, and performing eight calculations of the function P which is to be optimized. If the number of codes in the lookahead sequence (L) is changed, then a different number of calculations will be performed for each encoded bit fed out, and the number of clock pulses will be different. The encoding apparatus shown in FIG. 4 is designed specifically for a lookahead value L = 3, and it assumes a simple delta-modulation type of encoding process for illustrative purposes.

The operational steps described below are numbered to correspond with the respective numbers of the clock pulses that initiate them (FIG. 4):

1. The arithmetic unit 54 is reset so that the value P stored therein is zero. $N_k$ (the first bit of the test pattern now stored in counter 50) and $A_{k-1}$ (the absolute code corresponding to the last differentially encoded bit $N_{k-1}$ that was fed out of the encoder) are concurrently entered into the decoder 44.

2. Decoder 44 is enabled to calculate a new absolute code $A_k$, using the former code $A_{k-1}$ and the tentative value of the bit $N_k$ in the current test pattern.

3. The absolute code value $A_k$ just calculated by decoder 44 is now entered into the appropriate order of register 52.

4. The code $A_k$ and the second bit $N_{k-1}$ of the current test pattern are entered into decoder 44. The code $A_k$ and the first video input code $V_k$ in the lookahead sequence are entered into the arithmetic unit 54.

5. The decoder 44 is enabled to calculate a new code $A_{k+1}$ based upon the bit $N_{k+1}$ of the current test pattern and the previously calculated value of $A_k$. The arithmetic unit 54 is enabled to calculate $P = (A_k - V_k)^2$ which is the first term in the summation of the function defined hereinabove. These P values will be accumulated by the arithmetic unit 54 until execution of the function is completed.

6. The code value $A_{k+1}$ calculated by decoder 44 is entered into the register 52.

7. The code $A_{k+1}$, and the third bit $N_{k+2}$ of the current test pattern are entered into decoder 44. The code $A_{k+1}$ and the second input code $V_{k+1}$ of the current lookahead series are entered into the arithmetic unit 54.

8. The decoder 44 is enabled to calculate a new code $A_{k+2}$ using as inputs the bit $N_{k+2}$ of the test pattern and the previously calculated value of $A_{k+1}$. The arithmetic unit 54 is enabled to calculate a new value of P consisting of the previously calculated P value now augmented by $(A_{k+1} - V_{k+1})^2$.

9. The code $A_{k+2}$ calculated by decoder 44 is entered into the register 52.

10. The codes $A_{k+2}$ and $V_{k+2}$ are entered into the arithmetic unit 54.

11. The arithmetic unit 54 is enabled to calculate the value $P = P + (V_{k+2} - A_{k+2})^2$. This completes the accumulation of the intermediate $P$ values to give the final P value.

12. The comparator 56 is enabled to compare the value of P calculated by the arithmetic unit 54 with the value P* currently stored in register 58.

13. If the output of comparator 56 indicates that P is less than P*, then the following actions occur simultaneously:

a. The P* value in register 58 is set equal to the P value calculated by the arithmetic unit. This recognizes that the new P value more closely approaches the minimum value which corresponds to optimum performance of the lookahead encoder, under the presently assumed conditions.

b. The $V^*_{k+1}$ and $V^*_{k+2}$ values in register 40 are set equal to the $V_{k+1}$ and $V_{k+2}$ values now stored in this same register (if such equality does not already exist). This prepares register 40 for a subsequent shift operation, which will take place concurrently with the entry of a new video code into register 40.

c. In register 60, $N^*_k$ is set equal to $N_k$ in register 50. This is a tentative selection of the bit that subsequently will be fed out of the encoder, if no better match between the combination of input codes and the possible combinations of output codes is found.

d. For essentially the same reason as the foregoing, $A^*_k$ in register 52 is set equal to $A_k$ in the same register. If the current $A_k$ code represents the optimum choice, then it must be saved for use in encoding the next input video code.

If P is not less than P*, then steps *a–d* above are omitted.

14. The setting of the counter 50 is incremented by 1 to create a new bit pattern for testing. If counter 50 does not overflow, this means that the available bit patterns have not yet been exhausted. Under this condition, steps 1 to 14 merely are repeated, and no code bit is fed out. (The encoded N bit is not fed out until all of the available N-bit patterns have been tested.) If the incrementing of counter 50 causes it to overflow (i.e., go from a setting of 111 to 000, in this instance), this means that the last bit pattern in the series has been tested. In that event, the following actions take place concurrently:

a. The $N^*_k$ bit currently stored in register 60 is now fed out as the differentially encoded bit corresponding to the current $V_k$ video input code, and the overflow bit of counter 50 is reset to 0.

b. The $V_{k+2}$ value in shift register 40 is set equal to the next input video code from the scanning digitizer. At the same time, the former $V_{k+2}$ value (i.e., the present $V^*_{k+2}$ value) is shifted to the $V_{k+1}$ position in register 40, and the former $V_{k+1}$ value (i.e., the present $V^*_{k+1}$ value) is shifted to the $V_k$ position in this register. Thus, a new lookahead sequence of three video input codes is created.

c. A synch pulse is sent back to the image scanning digitizer to make a new video input code available for use at the proper time.

d. The $A^*_k$ value in register 52 now becomes the new $A_{k-1}$ value.

e. The P* value stored in register 58 is set to have the maximum possible value which P may have.

Steps 1–14 described above are repeated without interruption while the encoder is operating.

Special-purpose encoding hardware such as that shown in FIG. 4 enables the testing of the various N-bit patterns to take place very rapidly, and high encoding accuracy can be achieved with only a moderate sacrifice of the encoding rate, as compared with the conventional type of differential encoding without the lookahead feature, which is a little more rapid but much less accurate. The invention is not limited to special hardware implementations, however, and can readily be carried out by programming a general-purpose computer to perform operations which are analogous to those just described.

The effect of increasing L is to increase the encoding accuracy while decreasing the speed. In most situations it is found that very little additional accuracy is gained by increasing L beyond a certain small value (e.g., 4). Hence, for practical purposes, the encoding rate can be kept reasonably high without appreciably sacrificing the high accuracy that lookahead encoding is capable of providing.

It has been assumed in the present description that the video input has been first digitized into V codes before being introduced to the encoder. However, the operation is not necessarily limited to this mode. The video (V) input may be kept in analog form, and the computation of P may be performed by an analog calculator with A codes being converted to analog form for input to the calculator, if this mode of operation is found more convenient.

As mentioned above, a number of performance criteria may be used for measuring the correlation between V and A code sequences. One such criterion has been given as an example. Another (which perhaps is more likely to be used in practice) would be the minimum of the accumulated absolute values of the differences $V_i - A_i$, where $i$ varies from $k$ to $k+L-1$ for each of the test code patterns.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data compaction process of the differential encoding type for converting absolute input values obtained by sampling an analog signal into digitized code symbols that represent only the variations of such input values with respect to each other, a lookahead encoding method which comprises the steps of:

a. temporarily storing in a delay means representations of a sequence of input values derived from the sampled analog signal;
b. generating for successive availability a series of digital code patterns, each pattern representing a possible sequence of code symbols for tentatively representing in differentially encoded fashion the variations of said sequence of input values;
c. as each of said code patterns becomes available, calculating a sequence of output value representations which would be yielded by differentially decoding that code pattern if it were to represent the current sequence of input values;
d. as each sequence of output value representations is made available by step *c*, calculating the value of a performance function that measures the correlation between such output value sequence and the current input value sequence;
e. selecting for utilization the code pattern in said series whose calculated performance function indicates optimum correlation between the input and output value sequences; and
f. utilizing a chosen portion of said selected code pattern as the differentially encoded representation of a corresponding portion of said input value sequence.

2. A lookahead encoding method as set forth in claim 1 wherein step *f* involves utilizing the leading code symbol of the selected code pattern to represent the leading value of said input value sequence, irrespective of any discrepancy which may exist between said leading input value and the output value which will be represented by said leading code symbol when it ultimately is decoded.

3. A lookahead encoding method as set forth in claim 2 wherein the code symbols of said digital code patterns are individual bits, the leading bit of the selected pattern being utilized in step *f* to form a part of a delta-modulated output signal representing said analog signal in encoded form.

4. A lookahead encoding method as set forth in claim 1 in which the performance function calculated by step *d* is the summation of values $(V_i - A_i)^2$, where V represents an input value to be encoded, A represents a decoded output value, as calculated by step *c*, $i$ is an integer whose value ranges from $k$ (the serial number of the leading input value currently stored in said delay means) to $k+L+$, and L is the number of input values stored in said delay means, and step *e* involves selecting the code pattern which yields a performance function of minimum value for a given value of $k$.

5. Apparatus for encoding absolute input values of a sampled analog signal into digitized code symbols that represent the variations of such input values with respect to each other, said apparatus comprising:

a. delay means for temporarily storing a sequence of input values attained by the sampled analog signal;
b. digital code pattern generating means for making a series of code patterns successively available, each such pattern representing a possible sequence of code symbols tentatively representing in differentially encoded form the variations of said temporarily stored sequence of input values;
c. differential decoding means operable in response to each of said code patterns as it becomes available to generate the sequence of output value representations which would be produced by such a code pattern in the event it were selected to represent the sequence of input values currently stored in said delay means;
d. calculating means responsive to each sequence of output value representations generated by said decoding means to calculate the value of a performance function that measures the correlation between such output value sequence and the current input value sequence;
e. comparing means for determining which of the performance values calculated by said calculating means most satisfactorily meets a given performance criterion;
f. means for storing a chosen portion of the code pattern which constitutes the optimum encoded representation of the current input value sequence, as determined by said comparing means; and
g. output means utilizing said stored code pattern portion as a differentially encoded representation of a corresponding portion of said input value sequence.

6. Encoding apparatus of the kind set forth in claim 5 wherein the portion of the code pattern stored in means *f* is the leading code symbol of the code pattern selected by comparing means *e*, said output means utilizing said leading code symbol to represent the leading input value currently stored in delay means *a*.

7. Encoding apparatus of the kind set forth in claim 5 in which the performance function calculated by calculating means *d* is the summation of values $(V_i - A_i)^2$, where V represents an input value to be encoded, A represents a calculated output value, $i$ is an integer whose value ranges from k (the serial number of the leading input value currently stored in delay means *a*) to $k+L+$, where Ls the number of input values stored in said delay means, and comparing means *e* determines which of said code patterns has the performance function of minimum value.

8. A differential encoding apparatus of the delta modulation type comprising:

a. a shift register for storing a sequence of input code symbols representing sampled analog signal amplitudes;

b. a binary counter operable to generate a series of bit patterns, each such pattern representing a possible sequence of signal amplitude changes which could represent said sampled analog signal amplitudes in differentially encoded form;

c. differential decoding means operable in response to each of said bit patterns as it becomes available to generate the sequence of output code symbols which would be produced by such a bit pattern if it were to serve as the differentially encoded representation of said input code symbol sequence;

d. calculating means responsive to each sequence of output code symbols generated by said decoding means for calculating the value of a performance function that measures the correlation between the respective input and output code symbol sequences;

e. comparing means for determining which of the performance values calculated by said calculating means most satisfactorily meets a given performance criterion, thereby to determine the optimum bit pattern for representing the current sequence of stored input values; and f. output means utilizing the leading bit of said optimum bit pattern to furnish an output signal representing in differentially encoded form the leading input signal amplitude stored in said shift register.

* * * * *